(12) United States Patent
Kim

(10) Patent No.: US 9,493,182 B2
(45) Date of Patent: Nov. 15, 2016

(54) SYSTEM AND METHOD FOR COMPENSATING FRICTION ACCORDING TO RACK BENDING OF MDPS

(71) Applicant: Hyundai Motor Company, Seoul (KR)

(72) Inventor: Jae Hyung Kim, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 14/559,083

(22) Filed: Dec. 3, 2014

(65) Prior Publication Data

US 2015/0183453 A1    Jul. 2, 2015

(30) Foreign Application Priority Data

Dec. 27, 2013  (KR) .......................... 10-2013-0165255

(51) Int. Cl.
*B62D 5/04*    (2006.01)

(52) U.S. Cl.
CPC ............. *B62D 5/046* (2013.01); *B62D 5/0463* (2013.01); *B62D 5/0481* (2013.01)

(58) Field of Classification Search
CPC ... B62D 5/046; B62D 5/0463; B62D 5/0481
USPC .......................................................... 701/41
See application file for complete search history.

(56) References Cited

U.S. PATENT DOCUMENTS

| | | | |
|---|---|---|---|
| 6,427,552 B1 * | 8/2002 | Sahr ....................... | B62D 3/123 180/427 |
| 8,073,608 B2 | 12/2011 | Hulten et al. | |
| 8,150,582 B2 * | 4/2012 | Blommer ............. | B62D 5/0472 180/446 |
| 8,972,112 B2 * | 3/2015 | D'Silva .................... | B62D 6/00 180/446 |
| 2006/0106516 A1 * | 5/2006 | Pick ........................ | B62D 7/22 701/41 |
| 2011/0066330 A1 | 3/2011 | Kim | |
| 2011/0303480 A1 | 12/2011 | Shimizu et al. | |

FOREIGN PATENT DOCUMENTS

| | | |
|---|---|---|
| EP | 2364896 A1 | 9/2011 |
| JP | 2007-91109 A | 4/2007 |
| JP | 2008-49963 A | 3/2008 |
| KR | 10-0746687 | 8/2007 |
| KR | 10-2009-0092446 | 9/2009 |
| KR | 10-0921071 | 9/2009 |
| KR | 10-2012-0088213 | 8/2012 |
| KR | 10-2013-0066835 | 6/2013 |
| KR | 10-1285423 | 7/2013 |
| WO | WO 2010/144049 A1 | 12/2010 |

* cited by examiner

*Primary Examiner* — John Q Nguyen
*Assistant Examiner* — Anshul Sood
(74) *Attorney, Agent, or Firm* — Morgan, Lewis & Bockius LLP

(57) ABSTRACT

Disclosed are a system and a method for compensating friction due to rack bending in a motor driven power steering system. The system for compensating friction may include a rack bending signal processor and a friction compensation controller. The rack bending signal processor may determine whether a rack bar bends when a lateral force is transmitted to the rack bar in turn of a vehicle. The friction compensation controller may calculates a friction compensation torque by adding a counter-rack bending torque according to a bending displacement of the rack bar to a basic steering torque of a motor and control a current supplied to the motor to apply the friction compensation torque if it is determined that the rack bar bends.

6 Claims, 5 Drawing Sheets lateral force[$F_y = m_F$]

SYSTEM AND METHOD FOR COMPENSATING FRICTION ACCORDING TO RACK BENDING OF MDPS

CROSS-REFERENCE TO RELATED APPLICATION

The present application claims priority of Korean Patent Application Number 10-2013-0165255 filed on Dec. 27, 2013, the entire contents of which application are incorporated herein for all purposes by this reference.

BACKGROUND OF INVENTION

1. Field of Invention

The present invention relates to system and method for compensating friction due to rack bending in a motor driven power steering (MDPS) system, and more particularly to system and method for compensating friction due to rack bending in a motor driven power steering system which can improve steering comfort by compensating excessive friction between a rack bar and a bearing with motor torque when the rack bar is bent by a lateral force in a vehicle.

2. Description of Related Art

Power steering systems for vehicles are systems for increasing/decreasing the force that turns steering wheels and hydraulic power steering has been generally used.

Vehicles that are recently coming into the market are equipped with a motor driven power steering (MDPS) system to change a steering force in accordance with the running speed.

Thee motor driven power steering system is a speed sensitive power steering system, in which an Electronic Control Unit (ECU) of a motor driven power steering module provides a driver with the optimum steering comfort by controlling the steering angle and the operation of a motor in accordance with the speed of a vehicle.

In more detail, the motor driven steering system, a system that assists steering power with the power from a motor, includes a motor mounted on a steering column and generating power for steering, a rack bar connected with a steering shaft, a reduction gear box connecting the output shaft of the motor and the rack bar so that power can be transmitted therebetween, and an ECU controlling the motor in response to input about the vehicle speed, and assists a steering force.

As shown in FIGS. 1A and 1B, a rack bar 12 is arranged to be movable to the left or right through a bearing 14 in a rack bar housing 10. The rack bar 12 moves left or right for steering with rolling friction on the bearing 14 when a vehicle turns.

As shown in FIG. 2, a lateral force perpendicular to the steering shaft 16 is generated when the vehicle turns, and it is transmitted to the steering shaft 16 and the rack bar 12, as shown in FIGS. 1A and 1B.

With the lateral force transmitted to the rack bar 12, the rack bar keeps horizontal without bending when its rigidity is sufficient, but the rack bar bends when its rigidity is not sufficient.

As a rack bar is bent by a lateral force, excessive friction is generated on the contact surface between the rack bar and the bearing in the rack bar housing, such that smooth handle is not provided.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide system and method for compensating friction due to rack bending in a motor driven power steering system which can achieve smooth steering by determining whether the rack bar is bent by a lateral force and then compensating friction between a rack bar and a bearing due to a lateral force when the rack bar bends, with torque from a motor.

In various aspects, the present invention provides a system for compensating friction due to rack bending in a motor driven power steering system, which includes: a rack bending signal processor that determines whether a rack bar bends, when a lateral force is transmitted to the rack bar in turn of a vehicle; and a friction compensation controller that calculates a friction compensation torque by adding a counter-rack bending torque according to a bending displacement of the rack bar to a basic steering torque of a motor and controls a current supplied to the motor to apply the friction compensation torque, if it is determined that the rack bar bends.

In various other aspects, the present invention provides a method of compensating friction due to rack bending in a motor driven power steering system, which includes: determining whether a rack bar bends due to a lateral force when a vehicle turns; determining a friction compensation torque for friction between the rack bar and a bearing, if it is determined that the rack bar bends; and compensating the friction by controlling a motor to apply the friction compensation torque.

The determining of whether a rack bar bends may include: calculating a bending displacement of the rack bar; comparing the calculated bending displacement with a clearance between the rack bar and the bearing; and determining that the rack bar bends if the bending displacement of the rack bar is larger than the clearance of the rack bar and the bearing.

The bending displacement of the rack bar may be calculated from the following equation, $$w_{max} = \begin{cases} -\dfrac{a^{3/2}(L-a)(2L-a)^{3/2}P}{9\sqrt{3}\,EIL}, & a \geq \dfrac{L}{2} \\ -\dfrac{a(L^2-a^2)^{3/2}P}{9\sqrt{3}\,EIL}, & a \leq \dfrac{L}{2} \end{cases}.$$

The friction compensation torque may be obtained by adding a counter-rack bending torque according to the bending displacement of the rack bar to a basic steering torque of the motor. The counter-rack bending torque $T_{rack}$ according to the bending displacement of the rack bar may be calculated from $T_{rack} = dW_{max}/d\theta$.

The present invention provides the following effects from the exemplary embodiments.

According to the present invention, when a lateral force is transmitted to a rack bar in turn of a vehicle, whether the rack bar was bent by the lateral force is determined, and then when it is determined that the rack bar bends, it is possible to provide smooth steering by compensating the friction between the rack bar and a bearing due to the lateral force with motor torque.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
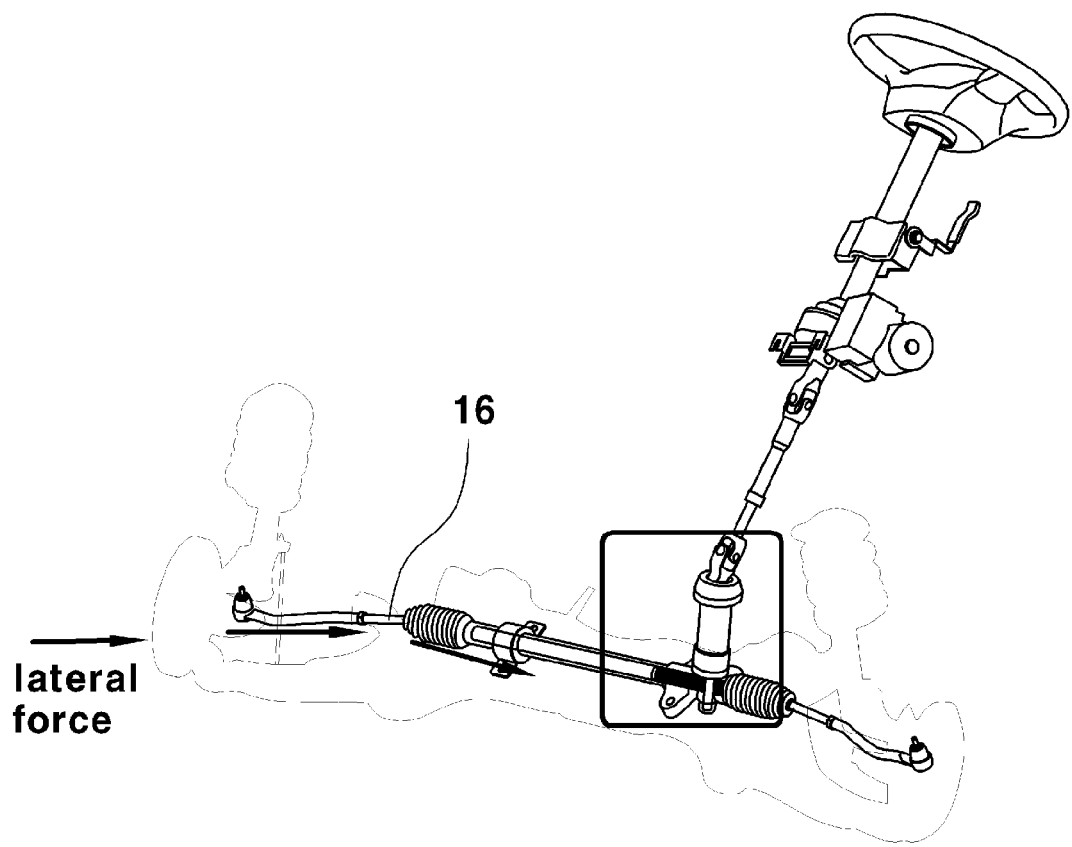
FIG. 1A is a view showing positions of a rack bar and a bearing in a motor driven power steering system.
Figure 1B:
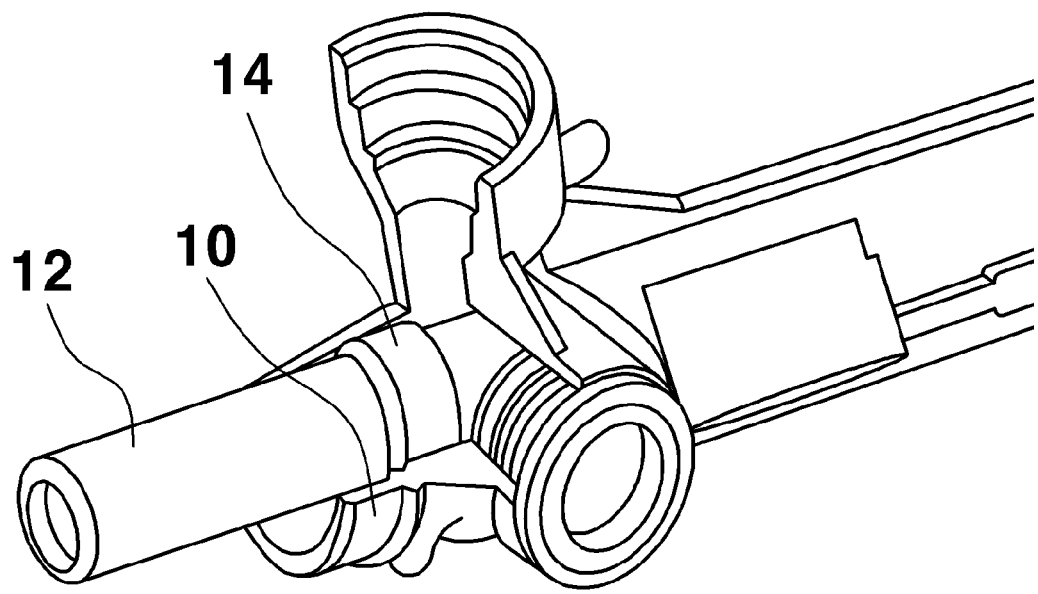
FIG. 1B is a partially enlarged view of FIG. 1A.
Figure 2:
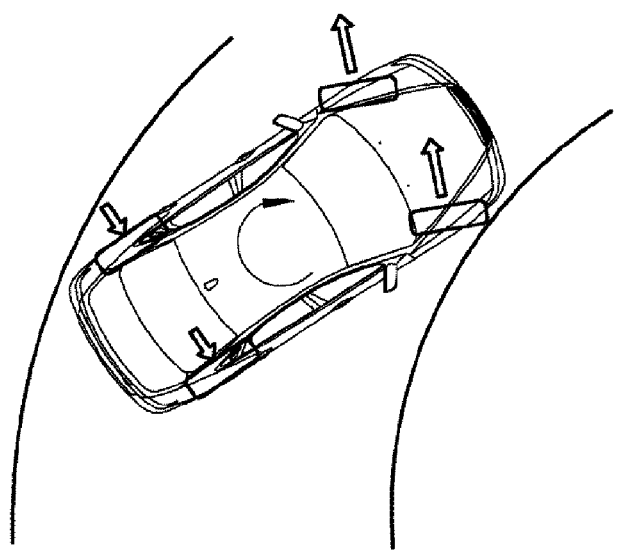
FIG. 2 is a schematic diagram showing a lateral force when a vehicle turns.
Figure 3:
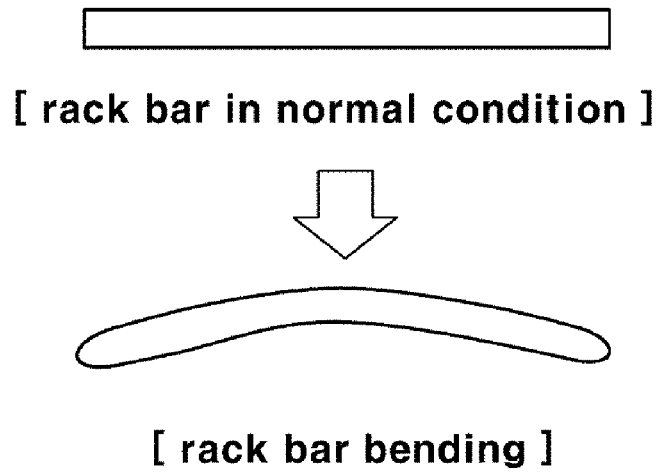
FIG. 3 is a view showing a rack bar bends by a lateral force when a vehicle turns.
Figure 4:
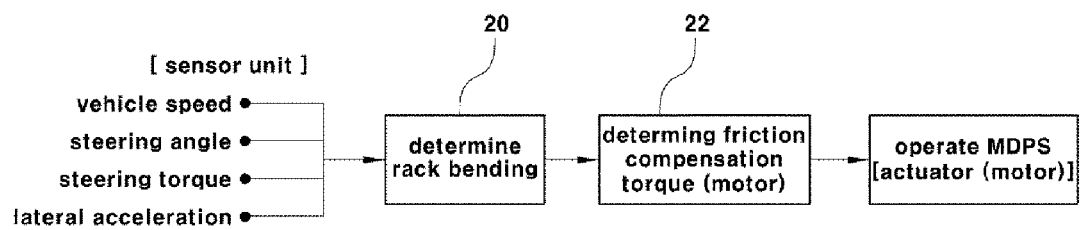
FIG. 4 is a diagram showing a configuration of an exemplary system for compensating friction due to rack bending in a motor driven power system according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention focuses on providing smooth steering when a vehicle turns, by compensating friction between a rack bar and a bearing due to a lateral force with friction compensation torque in the basic steering torque of a motor in order to solve the problem that smooth handling is not provided due to excessive friction on the contact surface between a rack bar and a bearing in a rack bar housing when the rack bar is bent by a lateral force in turn of a vehicle.

To this end, the system for compensating friction due to rack bending in a motor driven power steering system according to the present invention includes a rack bending signal processor 20 that determines whether a rack bar bends, when a lateral force is transmitted to the rack bar in turn of a vehicle and a friction compensation controller 22 that calculates the resultant motor torque obtained by adding counter-rack bending torque according to bending displacement of the rack bar to the basic steering torque of a motor and controls a motor current for applying the resultant motor torque, when it is determined that rack bar bends.

A method of compensating friction due to rack bending of the present invention which is implemented by the rack bending signal processor and the friction compensation controller is described as follows.

First, a step of determining whether a rack bar bends is performed by the rack bending signal processor 20.

When the vehicle turns and the rack bar moves left or right for steering with rolling friction on the bearing in the rack bar housing, excessive friction is generated on the contact surface between the rack bar and the bearing in the rack bar housing, such that the rack bar may bend. Accordingly, the rack bending signal processor 20 determines whether excessive friction is generated on the contact surface between the rack bar and the bearing due to a lateral force and the rack bar bends accordingly.

Figure 6:
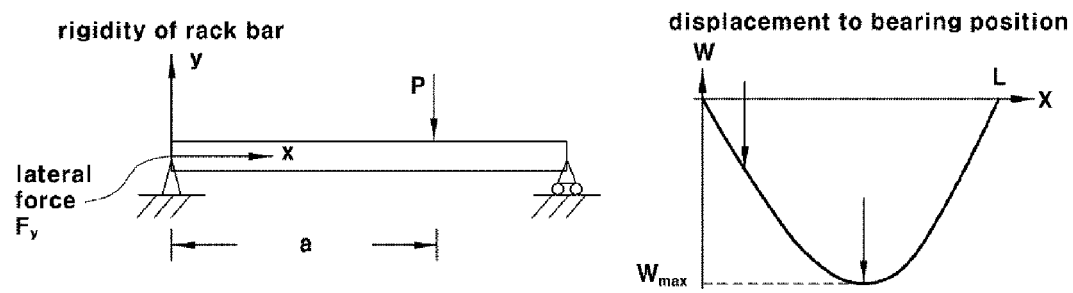
FIG. 6 is a schematic diagram illustrating the principle of calculating bending displacement of a rack bar in an exemplary method of compensating friction according to the present invention.
Figure 7:
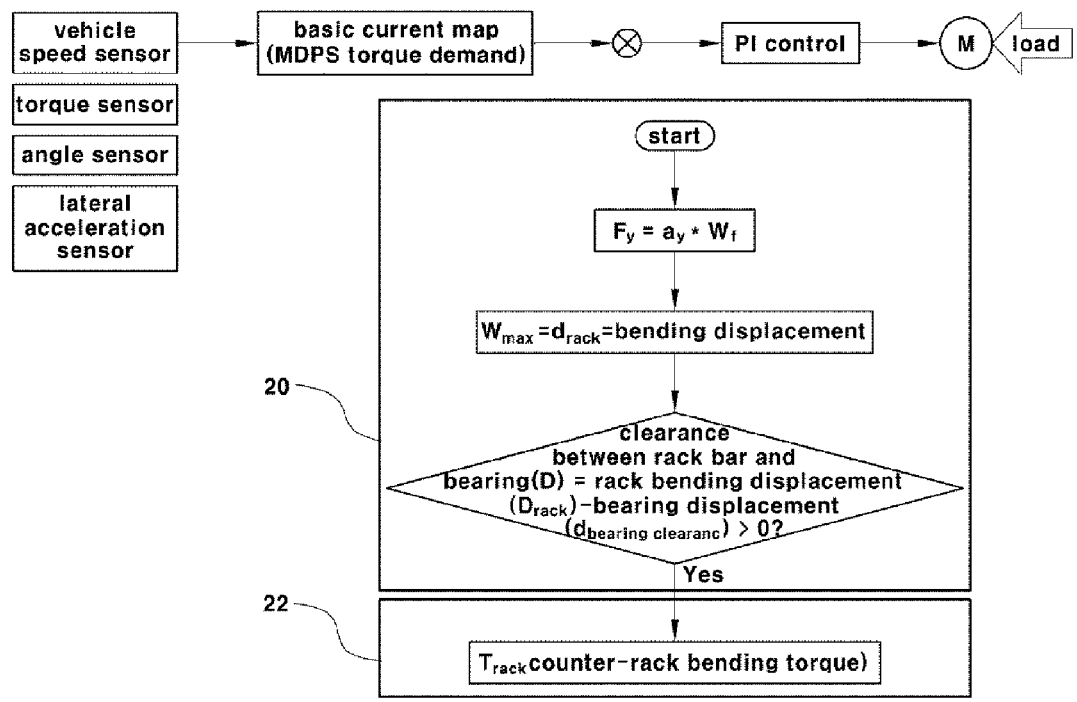
FIG. 7 is a flowchart illustrating an exemplary method of compensating friction due to rack bending in a motor driven power steering system according to the present invention.
Figure 8:
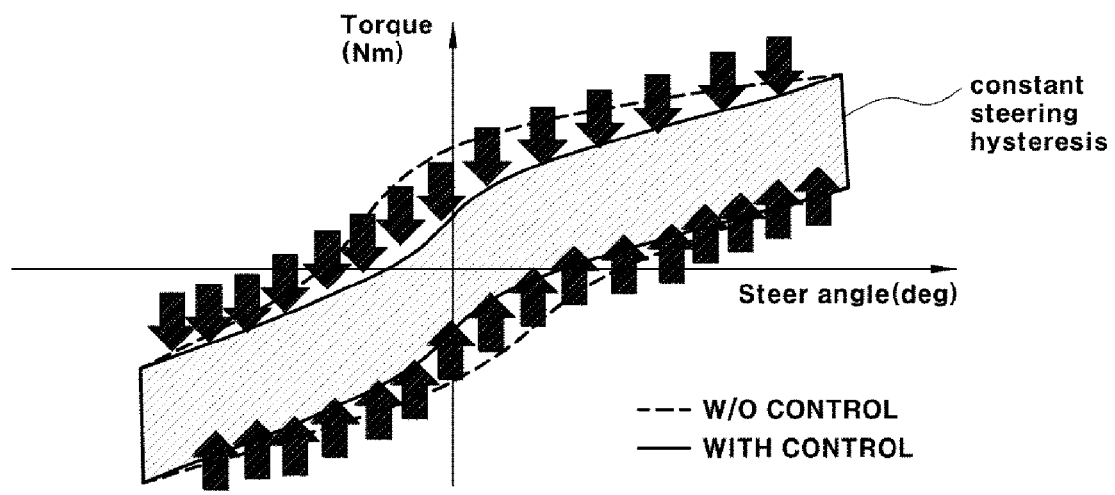
FIG. 8 is a graph showing constant steering hysteresis implemented by compensating friction due to rack bending in a motor driven power steering system according to the present invention.

FIG. 6 is a diagram illustrating the principle of calculating bending displacement (radial displacement) of a rack bar, where L is the entire length (mm) of the rack bar, P is a lateral force (Fy) on the rack bar, and α is the distance (mm) to the point where a bearing is mounted.

Therefore, the bending displacement ($W_{max}$) of the rack bar according to the position of the bearing can be calculated from the following Equation 1.

$$w_{max} = \begin{cases} -\dfrac{a^{3/2}(L-a)(2L-a)^{3/2}P}{9\sqrt{3}\,EIL}, & a \geq \dfrac{L}{2} \\ -\dfrac{a(L^2-a^2)^{3/2}P}{9\sqrt{3}\,EIL}, & a \leq \dfrac{L}{2} \end{cases} \quad \text{Equation 1}$$

where L is the entire length (mm) of the rack bar, P is a lateral force (Fy) on the rack bar, α is the distance (mm) to the point where a bearing is mounted, E is Young's modulus (modulus of elasticity), and I is elastic moment ($mm^4$).

Figure 5:
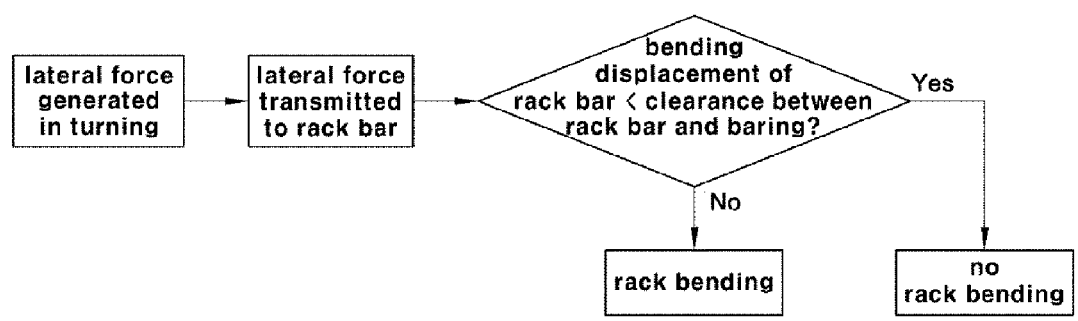
FIG. 5 is a flowchart illustrating a step of determining whether there is rack bending, in an exemplary method of compensating friction due to rack bending in a motor driven power steering system according to the present invention.

The bending displacement of the rack bar calculated from Equation 1 is compared with the clearance between the rack bar and the bearing, as shown in the flowchart in FIG. 5. When the bending displacement of the rack bar is smaller than the clearance between the rack bar and the bearing, it is determined that the rack did not bend, and when the bending displacement of the rack bar is larger than or equal to the clearance between the rack bar and the bearing, it is determined that the rack bar bends.

For reference, the clearance is a value set in the assembly design of the rack bar and the bearing.

Accordingly, the bending displacement of the rack bar when the rack bending signal processor 20 determines that the rack bar bends, that is, the bending displacement of the rack bar calculated from Equation 1 is transmitted to the friction compensation controller 22.

Thereafter, a step of determining friction compensation torque for the friction between the rack bar and the bearing and a step of controlling the motor current for the friction compensation torque are performed by the friction compensation controller 22. The friction compensation torque is obtained by adding counter-rack bending torque $T_{rack}$ according to the bending displacement of the rack bar to the basic steering torque of the motor which is required by the driver for turning the vehicle.

The counter-rack bending torque $T_{rack}$ according to the bending displacement of the rack bar can be calculated from the following Equation 2.

$$T_{rack} = dW_{max}/d\theta \quad \text{Equation 2}$$

The current supplied to the motor is controlled in order to apply the friction compensation torque, which is obtained by adding the counter-rack bending torque $T_{rack}$ according to the bending displacement of the rack bar to the basic steering torque of the motor, to the motor.

That is, the resultant MDPS motor control current Mi, the sum of the MDPS basic motor control current Ti for applying the basic steering torque of the motor and the counter-rack bending current Xi for applying the counter-rack bending torque, is supplied to the motor, such that the motor torque is increased and applied to the rack bar.

Accordingly, the motor outputs the friction compensation torque obtained by adding the counter-rack bending torque $T_{rack}$ according to the bending displacement of the rack bar to the basic steering torque of the motor, such that large motor torque is applied to the rack bar. Therefore, the excessive friction between the rack bar and the bearing is compensated and the driver feels smooth steering.

As described above, when a vehicle turns and a lateral force is transmitted to the rack bar, the friction between the rack bar and the bearing due to the lateral force is compensated with the motor torque even if the rack bar is bent by the excessive friction between the rack bar and the bearing, such that it is possible to keep providing smooth steering even though the vehicle turns.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for compensating friction due to rack bending in a motor driven power steering system, comprising:
    a rack bending signal processor that determines whether a rack bar bends, when a lateral force is transmitted to the rack bar in turn of a vehicle; and
    a friction compensation controller that calculates a friction compensation torque using a current steering angle $\theta$ by adding a counter-rack bending torque according to a bending displacement of the rack bar to a basic steering torque of a motor and controls a current supplied to the motor to apply the friction compensation torque, if it is determined that the rack bar bends.

2. A method of compensating friction due to rack bending in a motor driven power steering system, comprising:
    determining whether a rack bar bends due to a lateral force when a vehicle turns;
    determining a friction compensation torque for friction between the rack bar and a bearing located at an end of the rack bar, using a current steering angle $\theta$ and a bending displacement of the rack bar, if it is determined that the rack bar bends; and
    compensating the friction by controlling a motor to apply the friction compensation torque.

3. The method of claim 2, wherein the determining of whether a rack bar bends includes:
    calculating the bending displacement of the rack bar;
    comparing the calculated bending displacement with a clearance between the rack bar and the bearing; and
    determining that the rack bar bends if the bending displacement of the rack bar is larger than the clearance of the rack bar and the bearing.

4. The method of claim 3, wherein the bending displacement of the rack bar is calculated from:

$$w_{max} = \begin{cases} -\dfrac{a^{3/2}(L-a)(2L-a)^{3/2}P}{9\sqrt{3}\,EIL}, & a \geq \dfrac{L}{2} \\ -\dfrac{a(L^2-a^2)^{3/2}P}{9\sqrt{3}\,EIL}, & a \leq \dfrac{L}{2} \end{cases}$$

where L is a length of the rack bar, P is a lateral force on the rack bar, $\alpha$ is a distance to a point where the bearing is mounted, E is a Young's modulus (modulus of elasticity), and I is an elastic moment.

5. The method of claim 4, wherein the friction compensation torque is obtained by adding a counter-rack bending torque according to the bending displacement of the rack bar to a basic steering torque of the motor.

6. The method of claim 5, wherein the counter-rack bending torque $T_{rack}$ according to the bending displacement of the rack bar is calculated from $T_{rack} = dW_{max}/d\theta$,
    where $d\theta$ is a variation of the steering angle $\theta$, and $dW_{max}$ is a variation of the bending displacement $W_{max}$ of the rack bar with respect to a position of the bearing.

* * * * *